United States Patent [19]

Schmitt et al.

[11] 4,385,297

[45] May 24, 1983

[54] ARRANGEMENT FOR SENSING PROXIMITY OF A RECIPROCATING MEMBER

[76] Inventors: Wilhelm E. Schmitt, 660 Sunnyside Ave., Elmhurst, Ill. 60126; Robert V. C. Dickinson, 32 Debbie Pl., Berkely Heights, N.J. 07922

[21] Appl. No.: 111,719

[22] Filed: Jan. 14, 1980

[51] Int. Cl.³ ............... G08C 19/06; G08C 19/12; G01B 7/14
[52] U.S. Cl. .............. 340/870.31; 324/208; 324/220; 73/119 A; 340/870.18
[58] Field of Search ............ 340/870.31, 870.18, 340/870.32, 686, 603; 324/207, 208, 220, 239, 243; 336/130, 30, 45, 96, 221; 73/119 A; 123/612, 617

[56] References Cited

U.S. PATENT DOCUMENTS

| | | | |
|---|---|---|---|
| 2,210,970 | 8/1940 | Bonell | 340/870.31 |
| 2,397,032 | 3/1946 | Mestas | 340/870.31 |
| 2,833,046 | 5/1958 | Jeglum | 324/208 |
| 3,654,549 | 4/1972 | Maurer et al. | 324/208 |
| 3,735,244 | 5/1973 | Gumtau et al. | 324/208 |
| 3,828,247 | 8/1974 | Kirsch et al. | 73/119 A |
| 3,896,280 | 7/1975 | Blake | 200/81.9 M |
| 4,001,718 | 1/1977 | Wilson | 331/65 |
| 4,038,004 | 7/1977 | Hartmann | 425/150 |
| 4,096,841 | 6/1978 | Kindermann et al. | 123/617 |
| 4,206,687 | 6/1980 | Klaus et al. | 91/395 |
| 4,208,695 | 6/1980 | Noda et al. | 361/181 |
| 4,213,110 | 7/1980 | Holce | 335/207 |

Primary Examiner—James J. Groody
Attorney, Agent, or Firm—Dressler, Goldsmith, Shore, Sutker & Milnamow, Ltd.

[57] ABSTRACT

An eddy current coupled transducer and external electrical circuit are disclosed for use with a fluid actuator for detecting the relative position of the reciprocating member of the actuator. The transducer includes a fitting providing a fluid pressure seal whereby the transducer can be fitted to the actuator and communicate with its interior. The transducer detects the absolute position of the reciprocating member of the actuator by eddy current coupling. A change in the amplitude of the high frequency signal supplied to the transducer by the external electrical circuit occurs when the reciprocating member is in close proximity to the transducer. This change in amplitude is detected by the electrical circuit to provide an on-off switching signal for associated equipment in response to the position of the actuator reciprocating member.

7 Claims, 6 Drawing Figures

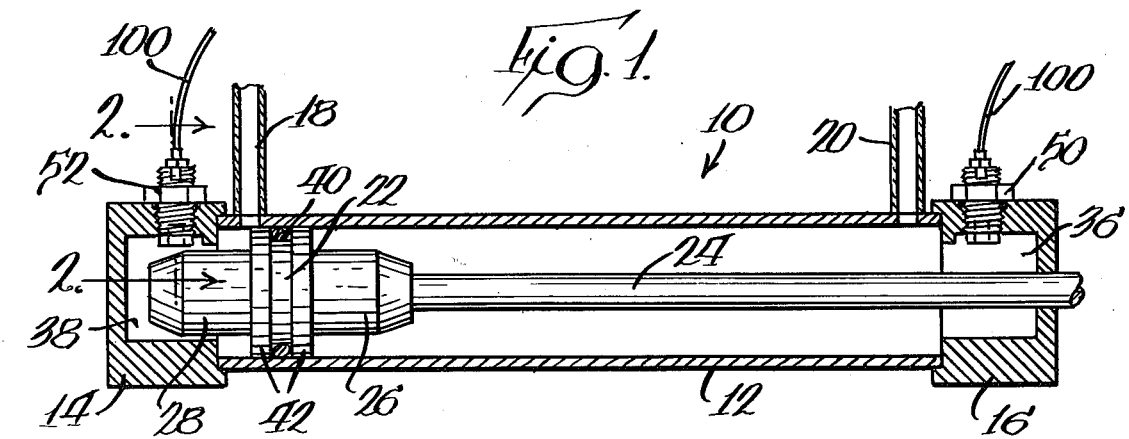
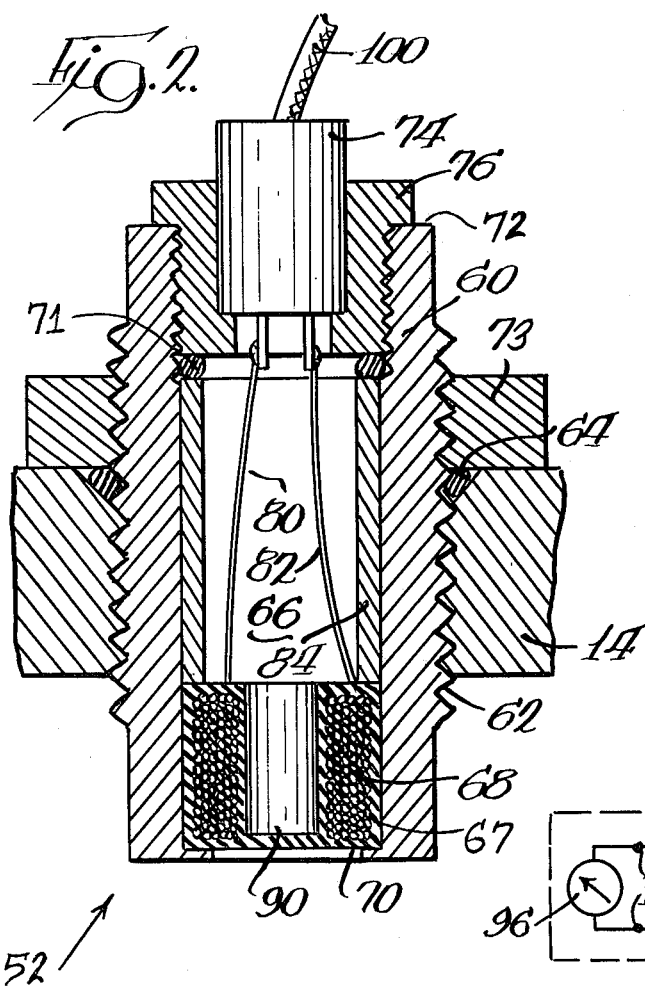
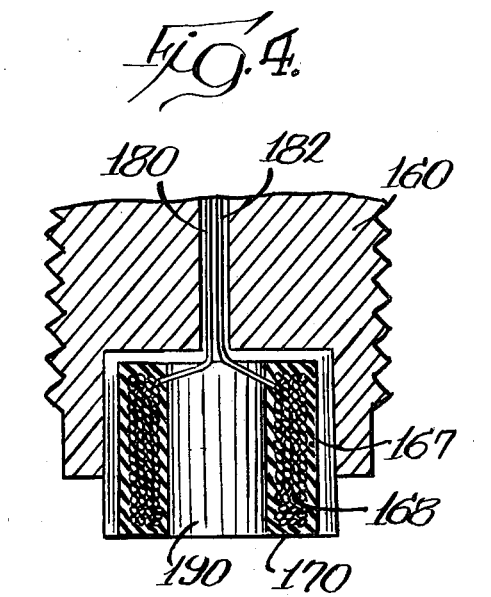
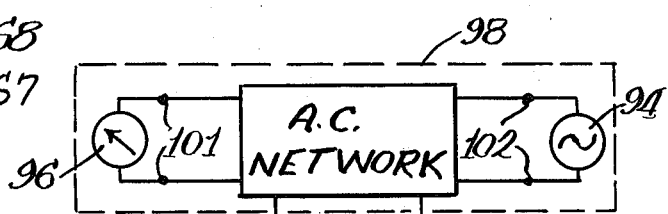

Fig. 6.
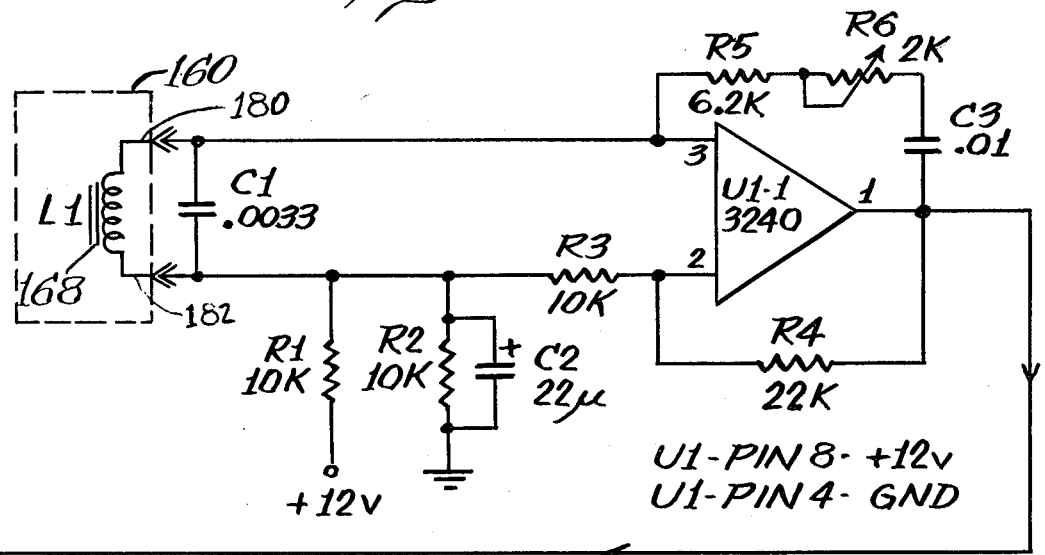
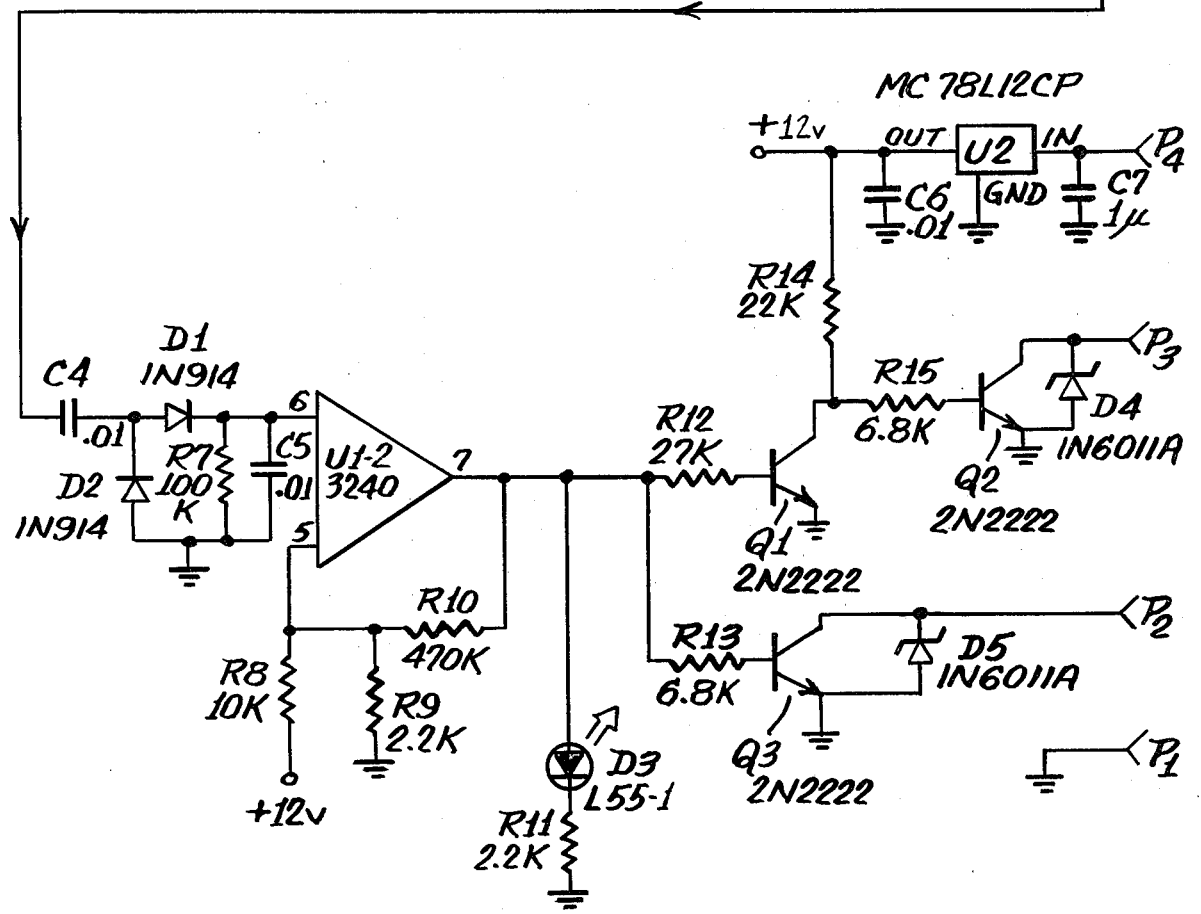

ARRANGEMENT FOR SENSING PROXIMITY OF A RECIPROCATING MEMBER

TECHNICAL FIELD

This invention relates to an apparatus for signaling the stroking of the piston of a fluid actuator. More particularly, an eddy current coupled transducer is described that responds to the relative position of the cushioning spud or piston of a fluid actuator.

BACKGROUND OF THE INVENTION

The application of fluid power is limited only by the ingenuity of the designer, the production engineer or the plant engineer. If the application pertains to lifting, pushing, pulling, clamping, tilting, forcing, pressing or any other straight line (and many rotary) motions, it is probable that fluid power will meet the requirements. The important part that fluid power plays in all phases of industry today is beyond calculation. To indicate its increasing importance, it only needs to be said that new uses are being found and adapted for air and hydraulic systems every day. The present invention was developed in recognition of the importance of fluid power actuators in industry.

The various designs of hydraulic or pneumatic fluid actuators cover such a wide range that it would be impracticable to describe all of them. Hydraulic cylinders recieve fluid pressure from a source of hydraulic fluid and transmit it into lineal force. These cylinders are often referred to as jacks or rams. Pneumatic cylinders use air under pressure. In either case, basic elements of a non-rotating cylinder are: a cylinder tube; a piston; a piston rod; covers or cylinder heads; and packing or seals. The specific application dictates pretty much the design and material of the actuator.

Cushioning, i.e., the gradual deceleration of the piston near to the end of its stroke, is a desirable feature for many applications. It is especially helpful when the piston rod is connected to a heavy load and the piston is travelling at a high rate of speed. It reduces the shock that would otherwise be caused if the piston were allowed to make sharp contact with the cylinder head without any buffer action.

A cushion is a chamber of relatively small diameter into which the cushion nose collar or spud enters as the piston near the end of its stroke so that fluid is trapped in the cylinder tube between the piston and the cylinder head. This fluid is bled off slowly, thereby reducing the rate of piston travel. Two parts of the cylinder are involved in cushioning: the cylinder head and the piston. For purposes of generality, a fluid actuator incorporating a cushioning feature will now be described.

In the operation of such devices, fluid under pressure enters one side of the cylinder portion of the actuator and forces the piston in the opposite direction. Fluid from the other side of the piston is free to flow out of the other end of the cylinder. This action continues until a raised or tapered portion extending from the piston reaches a cavity or opening at the end of the cylinder. The close tolerance between spud or raised portion of the piston and the complementary cavity reduces the flow of fluid out of that end of the cylinder. In effect, it serves as a metering orifice. The reduced volume rate of flow offers resistance to the moving piston and thus cushions the end of the piston stroke.

Very often in the operation of such devices and in the operation of associated machinery components, it is necessary to determine that the piston within the actuator has completed its stroke. This is because the completion of the stroke is used to interlock, trigger or set into motion other process system components.

Most commonly, external mechanical limit switches or knife switches are used to determine the position of a hydraulic piston and to initiate a successive machine cycle. The device disclosed by Allinquant et al. (U.S. Pat. Nos. 4,163,970 and 4,089,512) is typical. These switches are generally bulky and, by virtue of their mechanical nature are often difficult to position relative to the piston rod or cylinder. Because of the large forces associated with hydraulic actuators, externally mounted position detectors are very susceptible to coming out of alignment. In addition, hydraulic oil or dirt frequently "shorts out" the electrical contacts causing the switch to fail. Pneumatic actuators while not subjected to relatively large forces, are cycled at a relatively high rate. Vibration generally leads to misalignment of externally mounted limit switches. Failure of those switches, especially when used as part of a process system interlock, can lead to component failure in other parts of the cycle.

Most processes require fairly tight control; should any of the components come out of calibration or be actuated at the wrong time, the entire process system can come to a complete halt. Chemicals and other raw products are wasted and money is lost. For example, in the manufacture of soap, hydraulic oil leaking out of an actuator through the position detector can contaminate process system chemicals. A position detector that is not susceptible to falling out of calibration as a result of vibration or shock and one that is immune to hostile environmental conditions will be readily accepted by the industry. Heretofore, no one has successfully developed a non-mechanical position detector that can withstand high pressure over a long period of time without leaking.

SUMMARY OF THE INVENTION

In accordance with the present invention, a position detector or sensor is provided to detect the proximity of a stroking member of a fluid actuator. An encapsulated wire coil is positioned at the end of a threaded pressure fitting. The fitting is inserted into a hole tapped in the cylinder portion of the actuator (e.g., the cylinder head, cushioning cavity, etc.). The coil is located at a position within the actuator where it is within a small fraction of the diametrical dimension of the stroking member. For fluid actuators not having a cushioning spud the coil is positioned adjacent the piston. The coil may be aligned perpendicular to or parallel to the axis of the actuator. In the preferred embodiment, an open well at one end of the fitting is used to house the coil. The whole well is potted with a material which will secure the coil and withstand the deteriorating effects of the environment.

The coil is coupled to an external electrical network. Specifically, the coil forms the tank circuit of an oscillator. By sensing the amplitude of the oscillator output, the proximity of the stroking member of the actuator is detected.

The preferred detection circuit operates on what might be called "absorption" or, more specifically, "eddy currents." Sensing the presence of a metallic object is not based upon an inductance change or any secondary change such as the change of the frequency of the oscillator. A ferrous material in the field of the sensing coil will change the inductance, however, the specific circuitry employed is built to allow this to happen without event. The circuitry is arranged to give a very precise and stable gain in the oscillator circuit. This gain is insufficient to cause the oscillator to go into saturation. The amplitude of oscillation is reduced if power is coupled out of the oscillator tank circuit. When any conducting material is brought into the field of the oscillator, coil eddy currents are set up which are sustained by power from the oscillator; hence the oscillator amplitude decreases. This change in amplitude can be conveniently detected and used to perform the switching functions. A small amount of hystersis may be designed into the circuitry so the detector would not, in a marginal condition, be prone to sit on the edge and arbitrarily switch on and off. Thus, the detection of the presence of an object (i.e. piston or spud) is a function of measurement of the power or amplitude of the oscillator circuit rather than a change of inductance, etc. The circuit has a different sensitivity to different materials depending upon their conductivity, size, etc.

Because there are no moving parts, the position detector and associated circuitry will remain in calibration for an indefinite period of time. Because the coil is encapsulated within a pressure tight fitting, the device is resistant to changes produced by external environmental effects such as vibration. Finally, the "solid-state" design of the device precludes the leakage of hydraulic fluid that could interfere with process system components.

BRIEF DESCRIPTION OF THE DRAWINGS

FIG. 1 is a cross-sectional view of a fluid actuator employing the present invention as a proximity detector at either end of the cylinder;

FIG. 2 is an enlarged cross-sectional view of one embodiment of the position detector as viewed along line 2—2 of FIG. 1;

FIG. 4 is a partial cross-sectional view of another embodiment of the position detector shown in FIG. 3 when viewed along line 4—4 of FIG. 3;

FIG. 5 is a schematic representation of an electrical circuit associated with the position detectors shown in FIGS. 2 and 3; and FIG. 6 is a schematic diagram of an electrical network used to indicate the position of a hydraulic actuator.

DETAILED DESCRIPTION OF THE PREFERRED EMBODIMENTS

Figure 3:
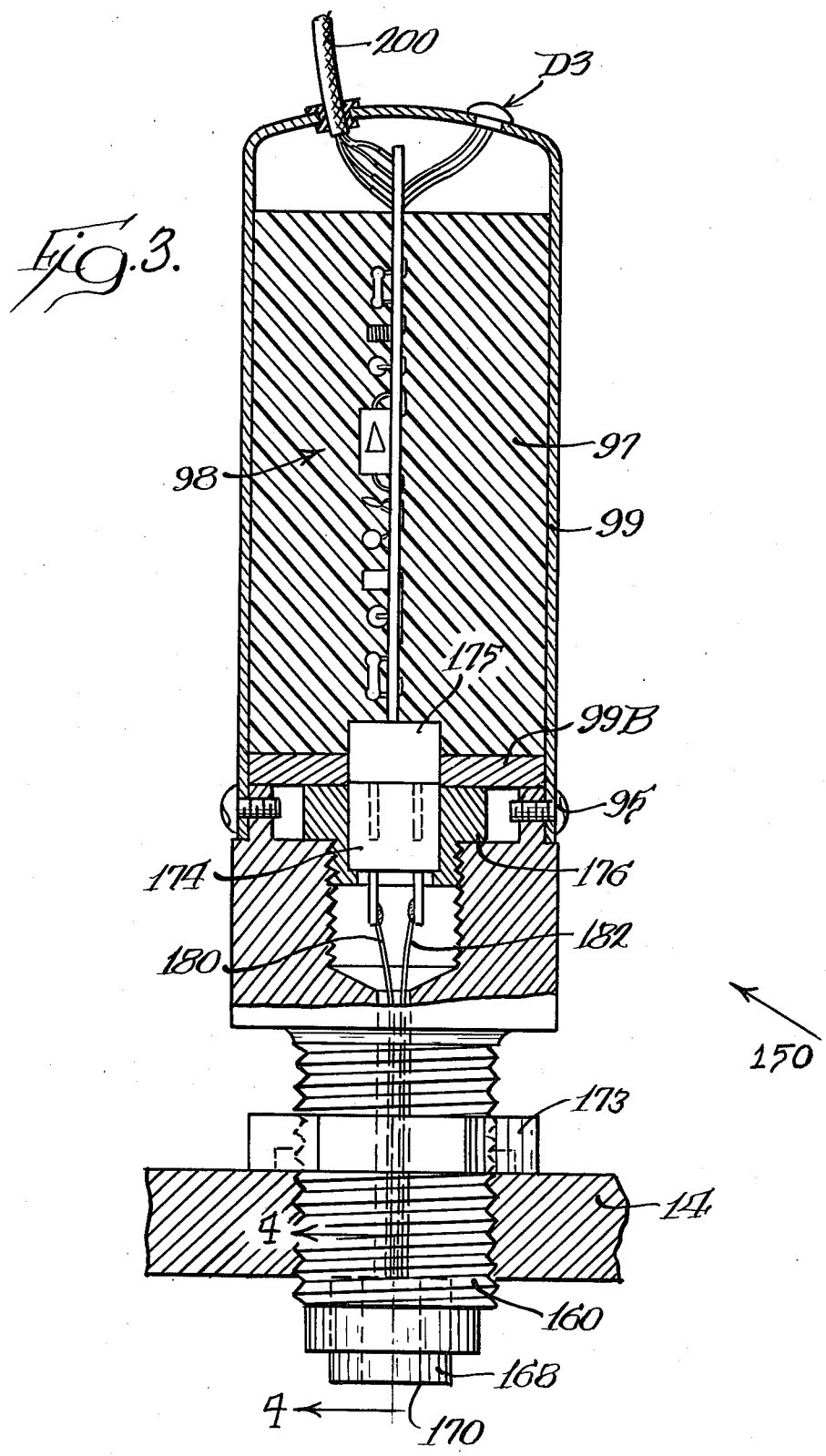
FIG. 3 is an enlarged cross sectional view of still another position detector showing the associated electronics components.

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the invention to the embodiments illustrated. The scope of the invention will be pointed out in the appended claims.

FIG. 1 illustrates a piston and cylinder actuator 10. The actuator may be pneumatically or hydraulically operated. The actuator 10 includes a cylindrical body 12 closed at either end by cylinder heads 14 and 16 and joined to inlet 18 and outlet 20 ports. A piston 22 is joined to a piston rod 24 passing through one cylinder head 16. The same principles would apply if the piston and cylinder combination were of the compound variety wherein the piston rod would be joined to both ends of the piston 22. For generality, the actuator 10 incorporates a piston having cushioning spuds 26 and 28. The apparatus to be described is not limited to actuators having cushioning spuds. These cushioning spuds mate with a cushioning cavity 36 and 38 in the cylinder heads 16 and 14, respectively. A seal 40 between piston land areas 42 provide a pressure boundary or seal between the two sides of the piston 22. Collectively, the spud and piston (on actuators having cushioning cavities) or the piston (on actuators not having cushioning cavities and spuds) are called the "reciprocating member" or the "stroking member" of the actuator.

Operation of the device is conventional. Briefly stated, fluid under pressure enters one end of the cylinder 12 to apply pressure to one face of the piston 22 while fluid is drained from the opposite end of the cylinder so as to allow the piston 22 to be driven or stroked across the cylinder 12. Once the cushioning spud 26 or 28 enters the cushioning cavity 36 or 38 the piston 22 is decelerated in its motion. This is because of the cushioning spud 26 or 28 physically compresses the fluid confined between spud 26 or 28 and the walls of the cushioning cavity 36 or 38. Thus, the piston 22 is decelerated in its motion at either end of its stroke. Depending on the application of the fluid actuator 10, a cushioning spud may be included on one or both sides of the piston 22.

Once the cushioning spud 26 or 28 enters the cushioning cavity 36 or 38, the stroke of the piston and piston rod is in effectively completed. In other words, the entry of the cushioning spud 26 or 28 into the cushioning cavity 36 or 38 marks the completion of the stroking of the hydraulic or pneumatic actuator 10. The transference of this relatively large mass of metal also provides a basis for detecting and signaling the completion of the stroking of the hydraulic or pneumatic actuator. In particular, the magnetic permeability of A.C. coupling of the region in the immediate vicinity of the cushioning cavity or piston changes. For this purpose, position sensors 50 and 52 are inserted within the cylinder heads 16 and 14. These position detectors may be installed at either or both ends of the cylinder depending upon which stroke of the piston is to be detected or indicated.

FIG. 2 is a cross-sectional view of one 52 of the position detectors shown in FIG. 1. The position detector is housed within a fitting 60 forming a pressure boundary between the interior of the cushioning cavity 38 and the exterior of the cylinder head 14. For purposes of illustration the fitting is shown having threads 62 for joining the fitting to the cylinder head. Other removable connecting means may be used. Similarly, for purposes of illustration, an O-ring 64 and a threaded nut 73 is used to form a secondary pressure boundary or backing seal between the threaded portion 62 of the fitting 60 and the exterior of the cylinder head. Other seals (e.g. wall seals, Teflon coatings, etc.) may be used. The fitting 60 is positioned within the cylinder head 14 at a distance in relation to the spud within the cushioning cavity 38 such that it is in very close proximity with the cushioning spud 28. The thickness of the fitting 60 is consistent with the pressure-forces applied or expected within the cushioning cavity 38 from the stroking of the piston 22. It should also be consistent with the expected normal operating pressure and hydrostatic or pneumatic test pressure of the actuator 12. These design techniques are known to those skilled in the art.

The fitting 60 features a hollow cavity 66 into which a coil of wire 68 is inserted. In this discussion, by "coil of wire" is meant the physical structure defined by a plurality of wire turns or windings. Preferably, the coil of wire 68 should be positioned as close as possible to the inner end or inside face 70 of the fitting 60. The coil 68 is encapsulated with a bonding material 67. In addition, and consistent with pressure requirements and corrosion considerations, the fitting is preferably made of a non-magnetic material.

At the opposite end or outside face 72 of the fitting 60, an electrical connector 74 is attached. For purposes of illustration a cap 76 is used to plug the exterior end of the cavity 66. The electrical connector 74 then mates with the cap 76. The two leads 80 and 82 of the coil 68 are joined to the electrical connector 74. Suitable slack is provided in these two leads 80 and 82 such that the connector 74 can be removed for access to the coil 68 and the cavity 66.

In order to position the coil 68 at a fixed position within the cavity 66 a cylindrical spacer 84 is provided. A Belleville spring or other compression device 71 may be used to insure a compact fit between the cap 76 and the coil 68, the objective being to hold the coil 68 in a relatively fixed position that is not affected by vibration or shock. Similarly, the cavity 66 may be dimensioned to fix the position of the coil 68. In this case the space through which the coil ends 80 and 82 are passed is relatively narrow compared to the end of the cavity housing the coil 68. In effect a recess or counter bore is drilled in the fitting 60 to form this seating surface.

Finally, for purposes of directing the magnetic lines of flux, a soft iron core 90 or a core made of other material having a high permeability is inserted. The core 90 is held in a relatively fixed position by spacers (not shown) similar to that used for holding the coil 68 in position. Depending on the coupling between the coil 68 and the piston or spud, the core 90 may or may not be necessary.

FIG. 3 illustrates a position detector 150 carrying the associated electronic circuitry 98 for the coil 168 in an external housing or case 99 attached to the fitting 160. This is the preferred embodiment. A schematic diagram of the electronic circuit 98 is shown in FIG. 6. FIG. 4 is a partial cross-sectional elevational view of the inner end 170 of the position detector. Components and features shown in FIGS. 3 and 4 having the same function and use as those shown in FIG. 2 are identified with a thre digit number beginning with a number one. Like the detector shown in FIG. 2, the coil 168 is permanently encapsulated or potted at one end of the fitting 160. A thermoset resin 167, not releasing water or other volatile products, may be used. Special care will have to be exercised to ensure the potting compound bonds to the fitting 160. A good seal is needed to keep the fluid within the cylinder from leaking out. In addition, the core 190 (if used) is potted in the center of the coil 168. The two leads 180 and 182 of the coil may also be permanently encapsulated within the fitting 160.

One advantage of a potted coil 168 is that such a coil is less susceptible to being disturbed or to having its position shifted as a result of vibration and shock. In addition, the overall size and thickness of the fitting can be reduced since the coil becomes part of the pressure boundary between the interior and the exterior of the actuator. Most importantly, the sensitivity of the detector is improved. For example, since the sensing distance for this type of device is relatively short, there is no problem in differentiating the presence of the piston head from the actuating rod when the detector is used at that end (i.e. at 50) of the actuator 10 having the piston rod 24. Because there are no moving parts and because the electrical current passing through the coil is relatively weak, such a position detector is expected to last indefinitely. At the very most the electrical connector may require minor maintenance and cleaning.

The position detector just described is joined to an external electrical circuit 98. (See FIG. 5) Because of the eddy current coupling between the coil 68 and the spud 26 or 28, or the piston 22, the position of the spud or piston relative to the coil 68 can be detected or signaled. Specifically, an A.C. network 98 (including a voltage oscillator 94 and a current detector 96) is encapsulated 97 in a housing or case 99 joined to the exterior of the fitting 60. This arrangement has the advantage in that the impedance resulting from relatively long cables 100 joining the position detector to the external electrical circuits often is equal to the magnitude of the change in power or oscillator amplitude resulting from the repositioning of the cushioning spud. In effect, the position detection circuit is "self contained" with only relatively low frequency (DC), low voltage signal cables and power cables 200 leaving the case 99. A transistorized switching circuit circuit is especially suitable for this application.

Referring to FIG. 3, it should be noted that the base 99B of the case 99 is connected to the body of the fitting 160 by a set of peripheral cap screws 95. The case 99 may also be configured to connect to the fitting 160 at right angles when space is at a preminum. By using a plug-in connection 175 between the connector 174 on fitting 160 and the network 98, maintenance and troubleshooting are simplified. A polarized plug is recommended.

Referring to FIG. 6, a schematic diagram is presented illustrating the preferred external electrical network 98 used with the fitting 60 and coil 68 to indicate the position of the spud or piston. The principle sections or elements of the electronic circuit are: a stabilized power supply U2; a switching network Q1, Q2, and Q3; an output operational amplifier U1-2; and an oscillator operational amplifier U1-1.

Referring to the oscillator operational amplifier (opamp) U1-1, the gain of the opamp is determined by the ratio of R4 to R3. In the particular case illustrated in FIG. 6, the gain is 2.2. The sensing coil 168 or L1 and the capacitor C1 form a tank circuit for an oscillator. L1 and C1 effectively determine the frequency of the oscillator. In the particular case illustrated, that frequency is in the vicinity of 300 kilohertz. R2 and C2, together with R1, form a DC reference bias. Effectively they form the only abolute voltage in the circuit feeding the first operational amplifier U1-1. Thus, the first operational amplifier U1-1 tends to float everything around this reference bias. In other words, because the gain is so high, the first operational amplifier U1-1 reacts to force pin 2 and pin 3 very close to the same voltage. Pins 2 and 3 are held at about 6 volts using the circuit components and values illustrated in FIG. 6. The loop formed by R5, R6, and C3 defines a positive feedback loop. R3 and R4 provide negative feedback. R5 and R6, incombination, introduce positive feedback. The amount of positive feedback is effectively adjusted by R6. C3 is a blocking capacitor.

If the loop containing the tank circuit L1 and C1 and the first opamp U1-1 is set into oscillation in the normal fashion, the circuit would be self regulating by virtue of the fact that it would go as high in amplitude as it could go before it ran out of supply voltage. At that point, its own non-linearity would stop it. However, no change could be sensed when the circuit is loaded. What this circuit does instead is to make the oscillation take place at a fairly well-established point which is not at saturation. Therefore, this loop is very sensitive to the power withdrawn due to the coupling between L1 and the reciprocating member or piston of the actuator. Thus, the output pin 1, of the first opamp U1-1 corresponds to the variation of the oscillator amplitude.

At this point it may well be noted that the particular operational amplifiers illustrated in FIG. 6 were selected because they are characterized by low leakage. Operational amplifiers having a FET (field effect transistor) input stage should have similar characteristics. These amplifiers are relatively easy to control. Since the particular unit can be purchased with two stages on the same component, costs are minimizes. Specifically and RCA CA3240 device was used.

Depending on the configuration of the housing or fitting 60 for the coil 68, the positive feedback will have to be adjusted to a slightly different value from one transducer to another. In this particular case, the value of R6 was selected so that it would be easy to adjust. However, there may be certain configurations where the range of resistor settings provided by R6 will be insufficient to set the circuit in operation. In those cases, a different value of R5 may have to be used. The values shown in FIG. 6, are sufficiently specific that one skilled in the art should have no problem setting the circuit in operation regardless of the configuration of his transducer 168 or coil L1.

The choice of L1 and C1 is governed by several factors. They can be selected over a broad range but it would be unwise to select a combination which would result in, say, the International Distress Frequency of 500 kilohertz. In any case, the particular frequency is not critical; the detector can work over a wide range of frequencies. The particular frequencies selected were chosen after considering coil size and the particular band pass width of the operational amplifier selected for use.

The second stage of the circuit or the output operational amplifier U1-2 uses the second half of the operational amplifier U1. D1 and D2 rectify the output of the oscillator opamp U1-1, the output signal being related to the amplitude of the oscillation. Specifically, D1 and D2 with C3 and C4 form a voltage doubler. Therefore, twice the peak voltage of the wave form (minus diode drops, of course) is sent into pin 6 of the operational amplifier U1-2. Pin 6 is the inverting input, while pin 5 is the non-inverting input.

The output operational amplifier U1-2 includes a provision for hysteresis or backlash. Specifically, a small amount of the signal from the output or pin 7 of opamp U1-2 is fed back through R10 and R9 to ground and then through R8 to the +12 VDC supply. Stated differently, a bleeder is formed by the +12 VDC input applied through R8 and through R9 to ground, the result being a fixed voltage at pin 5 or the non-inverting input of opamp U1-2. If the voltage output of the amplifier, U1-2 goes up, a small amount of that voltage is fed back to pin 5 through R10. This causes the voltage at pin 5 to go to a higher value. In effect, a positive feedback is produced as soon as the output setting goes over the threshold value determined by R8 and R9. This turns the opamp U1-2 on.

To turn the opamp U1-2 off, a lower voltage is necessary (in this case, a higher voltage on pin 6) to overcome the positive feedback introduced to pin 5. Thus, there is a "hysteresis effect" in this stage. This means that once it turns on, the signal has to go somewhat below the threshold setting to turn it off and vice-versa.

Remembering that output of the first operational amplifier U1-1 is in effect a measurement of the amplitude of the oscillator, whenever this oscillator amplitude output is large enough (after rectifaction by D1 and D2 to exceed the threshold values set by R8 and R9), the second operational amplifier U1-2 is turned on. Thus, whenever a reciprocating member of the actuator "couples out" a sufficient amount of power from L1, the oscillator amplitude will fall below the threshold setting. This drop in amplitude may be sufficient enough to shut the oscillator off. However, because of the particular way in which the threshold setting is used in the second operational amplifier U1-2, complete cut-off of the oscillator is not required. All that is needed is that the output of the oscillator, after voltage doubling, fall below the threshold setting.

The output pin 7 of the second operational amplifier U1-2 is fed to a light-emitting diode (LED) D3. This LED provides a status indication of the state of the second operational amplifier U1-2. It assists personnel in troubleshooting and adjusting the transducer locally (see FIG. 5).

It should be appreciated that since the rest position of the spud 26 and 28 within the cushioning cavity 36 and 38 of the cylinder 12 is only used for signalling the complete or ending of the stroke and not for indicating the instantaneous position of the piston within the cylinder, a binary or go/no-go signal is all that is needed to signal the proximity of the stroking member relative to the sensor or to signal the completion of the stroke. Consequently, the external electrical circuit 98 preferably produces a binary voltage output signal (ex. similar to the opening and closing of the contacts of a SPDT switch or relay). This two level signal can be used to operate signal indicators or lights and to initiate other process components. In effect, the binary signal would function as the opening and closing of a switch. Many devices for changing a current signal to a two level voltage signal are well known to those skilled in the art.

The components to the right of pin 7, of U1-2 in particular, Q1, Q2, and Q3, are conventional transistor switching elements. Pin three P-3 is a normally closed contact, while pin two P-2 is a normally open contact. Because of the hysteresis built into the output operational amplifier U1-2, this op-amp is either hard on or hard off; it is either very close to +12 VDC or 0 VDC. This produces a switching effect in Q1 and Q3. Q1, of course, inverts the signal to switch off Q2 thus producing essentially a closed contact point at P2 and a open contact point at P2. The ground connection is at pin one P-1.

D4 and D5 are zener diodes. They are provided for circuit protection only. For a positive voltage, they will conduct at their rating, which is in excess of 30 volts. As a negative polarity, they will effectively produce an output diode conducting at 0.7 volts. Joined to pin four P-4 is a source of unregulated DC power having a range from 14 to 30 volts DC. U-2 regulates this power to produce a fairly smooth +12 VDC used to power the two operational amplifiers U1-1 and U1-2. Pins one through four (P-1, P-2, P-3, and P-4) are harnessed together in a common cable to provide indication and control to a remote external point.

It should also be noted that these sensors may be placed anywhere on the hydraulic cylinder along the periphery of the stroke of the reciprocating member where one would desire to sense intermediate positions, calculate velocity, and do similar functions.

Of course, as was otherwise stated, the improved proximity detector may be used in other related hydraulic actuators including pneumatic actuators or in any other type of actuator calling for the use of cushioning device or piston to produce a stroking effect. The invention is not limited to hydraulic fluid actuators or actuators using cushioning spuds per se. It is equally applicable to other devices employing similar components. It is, of course, intended to cover by the appended claims all such modifications that fall within the scope of the invention.

What is claimed is as follows:

1. An eddy current coupled transducer, joined to an external electrical network including an alternating current resonant circuit associated with the transducer, for a fluid actuator having a reciprocating member driven between two positions defined by said actuator, comprising:
   (a) a fitting physically attached to said fluid actuator at a fixed reference point, said fitting defining a fluid-pressure impervious seal between the interior and the exterior of said fluid actuator;
   (b) a plurality of turns of wire defining encapsulated wire coil means further providing the fluid-pressure impervious seal and defining the power distribution and frequency of said network, said encapsulated coil means being mounted within said fitting and having a face in contact with the fluid interior of said actuator, whereby said coil means are electromagnetically responsive and eddy current coupled to said reciprocating member in a first position of said member, and said coil means are electromagnetically non-responsive to said reciprocating member in a second position of said member, said coil means thereby responding to the position of said reciprocating member relative to said coil means; and
   (c) connector means, joined to said fitting and electrically joined to said wire coil means for connecting said coil means to said external electrical network whereby the position of said reciprocating member relative to said reference point electrically affects the electrical power distribution in said external network by altering the alternating current amplitude within said resonant circuit.

2. The transducer defined in claim 1, further including a cap, said cap enclosing and sealing the interior of said coil means from the environment, said cap being removably joined to said fitting, said connector means being removably joined to said cap.

3. The transducer defined in claim 1, wherein that portion of said fitting interior of said actuator is formed from non-magnetic material, and magnetic field lines couple said reciprocating member with said coil means in the first position of said reciprocating member.

4. The transducer defined in claim 1, further including a core of magnetic material of high permeability, said core funneling magnetic field lines which couple the reciprocating member with said coil means in the first position of said reciprocating member.

5. An eddy current coupled transducer, joined to an external electrical network, for a fluid actuator having a reciprocating member driven between two positions defined by said actuator, comprising:
   (a) a fitting physically attached to said fluid actuator at a fixed reference point, said fitting defining a seal between the interior and the exterior of said fluid actuator;
   (b) a plurality of turns of wire defining wire coil means, said coil means being mounted within said fitting, whereby said coil means are electromagnetically responsive and coupled to said reciprocating member in a first position of said member, and said coil means are electromagnetically non-responsive to said reciprocating member in a second position of said member, said coil means thereby responding to the position of said reciprocating member relative to said coil means;
   (c) connector means, removably joined to said fitting and electrically joined to said wire coil means for connecting said coil means to said external electrical network whereby the position of said reciprocating member relative to said reference point electrically affects the electrical power distribution in said external network, and
   at least one spacer, said spacer positioning said coil means in proper spatial relationship relative to the axis of said reciprocating member to provide an electrical response in said external electrical network corresponding to the position of said reciprocating member relative to said reference point on said fluid actuator.

6. Apparatus for detecting the stroking of a fluid actuator having a reciprocating member, comprising:
   (a) an oscillator providing an alternating current signal;
   (b) first encapsulated coil means disposed within a fitting removably joined to a fixed member of said fluid actuator and on the periphery of the path traversed by said reciprocating member and electrically driven by said signal, for changing power distribution within an electrical resonant circuit defined by coupling said oscillator to said first coil means, said encapsulated coil means having a face in contact with the fluid interior of said actuator and providing a fluid-pressure impervious seal with said fitting between the interior and exterior of the actuator, said first coil means being electromagnetically responsive to said reciprocating member in a first position of said member by eddy current coupling and said first coil means being electromagnetically non-responsive to said reciprocating member in a second position of said member, whereby the amplitude of the signal flowing through said resonant circuit is responsive to the position of said reciprocating member relative to said coil means; and
   (c) means, electrically coupled to said resonant circuit, for producing an output signal responsive to said power distribution achieving a pre-selected value, said output signal having a characteristic responsive to said reciprocating member changing position relative to said coil means, whereby the stroking of said fluid actuator produces a signal corresponding to said pre-selected value.

7. The apparatus defined in claim 6, further including: second encapsulated coil means, physically attached to said fixed member of said fluid actuator and spaced from said first coil means and electrically driven by said alternating current signal, for changing the amplitude of the alternating current signal to produce said output signal flowing through the resonant circuit, said second coil means forming a part of said resonant circuit, the current flowing through said resonant circuit being also responsive to the position of said reciprocating member relative to said second coil means.

* * * * *